(12) United States Patent
Takashima et al.

(10) Patent No.: US 11,232,181 B2
(45) Date of Patent: *Jan. 25, 2022

(54) FACE AUTHENTICATION SYSTEM, FACE AUTHENTICATION METHOD, BIOMETRICS AUTHENTICATION SYSTEM, BIOMETRICS AUTHENTICATION METHOD, AND STORAGE MEDIUM

(71) Applicant: NEC Corporation, Tokyo (JP)

(72) Inventors: Shinya Takashima, Tokyo (JP); Shizuo Sakamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,541

(22) Filed: Sep. 26, 2019

(65) Prior Publication Data

US 2020/0019692 A1 Jan. 16, 2020

Related U.S. Application Data

(63) Continuation of application No. 16/275,528, filed on Feb. 14, 2019, now Pat. No. 10,719,595, which is a
(Continued)

(30) Foreign Application Priority Data

Jun. 5, 2017 (JP) ................... 2017-110667

(51) Int. Cl.
*G06F 21/32* (2013.01)
*H04L 29/06* (2006.01)
(Continued)

(52) U.S. Cl.
CPC ........... *G06F 21/32* (2013.01); *G06K 9/6215* (2013.01); *G06T 7/00* (2013.01); *G09B 7/00* (2013.01);
(Continued)

(58) Field of Classification Search
None
See application file for complete search history.

(56) References Cited

U.S. PATENT DOCUMENTS

| | | | |
|---|---|---|---|
| 9,639,683 B2 | 5/2017 | Suwa et al. | |
| 10,325,259 B1 | 6/2019 | Shahidzadeh et al. | |

(Continued)

FOREIGN PATENT DOCUMENTS

| | | |
|---|---|---|
| JP | 2004-265231 | 9/2004 |
| JP | 2007-249585 | 9/2007 |

(Continued)

OTHER PUBLICATIONS

Office Action, dated Oct. 11, 2019, issued by the United States Patent Office in counterpart U.S. Appl. No. 16/275,528.

(Continued)

*Primary Examiner* — Arezoo Sherkat

(57) ABSTRACT

According to at least one example embodiment of the present invention, provided is a face authentication system including: a criterion setting unit that sets a criterion of face authentication performed on a user so as to be different in accordance with a state of an access target system accessed by the user; and a face authentication unit that performs face authentication of the user based on the criterion.

17 Claims, 13 Drawing Sheets

Related U.S. Application Data continuation of application No. PCT/JP2018/021163, filed on Jun. 1, 2018.

(51) Int. Cl.
  *G09B 7/00* (2006.01)
  *G06K 9/62* (2006.01)
  *G06T 7/00* (2017.01)
  *G06K 9/00* (2006.01)

(52) U.S. Cl.
  CPC ...... *H04L 63/0861* (2013.01); *G06K 9/00288* (2013.01)

(56) References Cited

U.S. PATENT DOCUMENTS

| | | | |
|---|---|---|---|
| 10,701,067 | B1 | 6/2020 | Zraknejad et al. |
| 2007/0288748 | A1 | 12/2007 | Kakiuchi et al. |
| 2909/0292927 | | 11/2009 | Wenzel et al. |
| 2010/0148922 | A1 | 6/2010 | Yamada et al. |
| 2013/0004029 | A1 | 1/2013 | Yamada |
| 2014/0068726 | A1 | 3/2014 | Jakobsson et al. |
| 2014/0189807 | A1* | 7/2014 | Cahill ................. H04L 63/0861 726/4 |
| 2015/0324559 | A1* | 11/2015 | Boss ........................ H04L 63/08 726/1 |
| 2016/0055327 | A1* | 2/2016 | Moran ............... G06K 9/00899 726/19 |
| 2016/0364610 | A1* | 12/2016 | Jung ................. G06K 9/00617 |
| 2017/0091439 | A1 | 3/2017 | Sharma et al. |
| 2018/0054733 | A1 | 2/2018 | Houseworth et al. |
| 2018/0139606 | A1 | 5/2018 | Green et al. |
| 2018/0276465 | A1 | 9/2018 | Lee et al. |
| 2018/0285544 | A1* | 10/2018 | Chang ................ G06K 9/00892 |
| 2019/0362129 | A1 | 11/2019 | Sandhan et al. |

FOREIGN PATENT DOCUMENTS

| | | |
|---|---|---|
| JP | 2008-262475 | 10/2008 |
| JP | 2009-294780 A | 12/2009 |
| JP | 2011-053969 A | 3/2011 |
| JP | 2013-12130 | 1/2013 |
| JP | 2013-45300 | 3/2013 |
| JP | 2018-120375 A | 8/2018 |

OTHER PUBLICATIONS

International Search Report dated Aug. 21, 2018, in corresponding PCT International Application.
Notice of Allowance, dated Mar. 5, 2020, issued by the United States Patent Office in counterpart U.S. Appl. No. 16/275,528.
Office Action dated Sep. 3, 2020, issued by the Japanese Patent Office in counterpart Japanese Patent Application No. 2019-523503.
U.S. Office Action for U.S. Appl. No. 16/584,474 dated Feb. 10, 2021.
U.S. Notice of Allowancfor U.S. Appl. No. 16/584,474 dated Sep. 20, 2021.
Japanese Office Action for JP Application No. 2021-006098 dated Nov. 16, 2021 with English Translation.

* cited by examiner

FACE AUTHENTICATION SYSTEM, FACE AUTHENTICATION METHOD, BIOMETRICS AUTHENTICATION SYSTEM, BIOMETRICS AUTHENTICATION METHOD, AND STORAGE MEDIUM

CROSS-REFERENCE TO RELATED PATENT APPLICATIONS

This application is a continuation of U.S. patent application Ser. No. 16/275,528, filed Feb. 14, 2019, which is a National Stage Entry of International Application No. PCT/JP2018/021163, filed Jun. 1, 2018, which claims priority from Japanese Patent Application No. 2017-110667, filed Jun. 5, 2017. The entire contents of the above-referenced applications are expressly incorporated herein by reference.

TECHNICAL FIELD

The present invention relates to a face authentication system, a face authentication method, a biometrics authentication system, a biometrics authentication method, and a storage medium.

BACKGROUND ART

Patent Literature 1 discloses a face image recording system that can identify whether or not the user is a person in question by capturing a face image of a user and comparing the face image with a recorded face image.

CITATION LIST

Patent Literature

PTL 1: Japanese Patent Application Laid-Open No. 2004-265231

SUMMARY OF INVENTION

Technical Problem

In a face authentication system as disclosed in Patent Literature 1, when multiple times of face authentication are repeated, it may be an objective to set a suitable criterion in order to sufficiently reduce an error such as erroneous acceptance of a wrong person, erroneous rejection of a correct person, or the like and ensure a sufficient authentication accuracy.

At least one example embodiment of the present invention has been made in view of the above objective and intends co provide a face authentication system, a face authentication method, and a storage medium that can set a criterion of face authentication in a more suitable manner.

Further, at least another example embodiment of the present invention intends to provide a biometrics authentication system, a biometrics authentication method, and a storage medium that can set the biometrics authentication accuracy in a more suitable manner.

Solution to Problem

According to one example aspect of the present invention, provided is a face authentication system including: a criterion setting unit that sets a criterion of face authentication performed on a user so as to be different in accordance with a state of an access target system accessed by the user; and a face authentication unit that performs face authentication of the user based on the criterion.

According to another example aspect of the present invention, provided is a face authentication method including: setting a criterion of face authentication performed on a user so as to be different in accordance with a state of an access target system accessed by the user; and performing face authentication of the user based on the criterion.

According to yet another example aspect of the present invention, provided is a storage medium in which a program is stored, and the program causes a computer to execute: setting a criterion of face authentication performed on a user so as to be different in accordance with a state of an access target system accessed by the user; and performing face authentication of the user based on the criterion.

According to yet another example aspect of the present invention, provided is a biometrics authentication system including: an accuracy setting unit that sets an accuracy of biometrics authentication performed on a user so as to be different in accordance with a state of an access target system accessed by the user; and a biometrics authentication unit that performs biometrics authentication of the user based on the accuracy.

According to yet another example aspect of the present invention, provided is a biometrics authentication method including: setting an accuracy of biometrics authentication performed on a user so as to be different in accordance with a state of an access target system accessed by the user; and performing biometrics authentication of the user based on the accuracy.

According to yet another example aspect of the present invention, provided is a storage medium in which a program is stored, and the program causes a computer to execute setting an accuracy of biometrics authentication performed on a user so as to be different in accordance with a state of an access target system accessed by the user; and performing biometrics authentication of the user based on the accuracy.

Advantageous Effects of Invention

According to at least one example embodiment of the present invention, a face authentication system, a face authentication method, and a storage medium that can set a criterion of face authentication in a more suitable manner can be provided.

Further, according to at least another example embodiment of the present invention, a biometrics authentication system, a biometrics authentication method, and a storage medium that can set the biometrics authentication accuracy in a more suitable manner can be provided.

DESCRIPTION OF EMBODIMENTS

Exemplary example embodiments of the present invention will be described below with reference to the drawings. Throughout the drawings, the same components or corresponding components are labeled with the same reference, and the description thereof may be omitted or simplified.

First Example Embodiment

Figure 1:
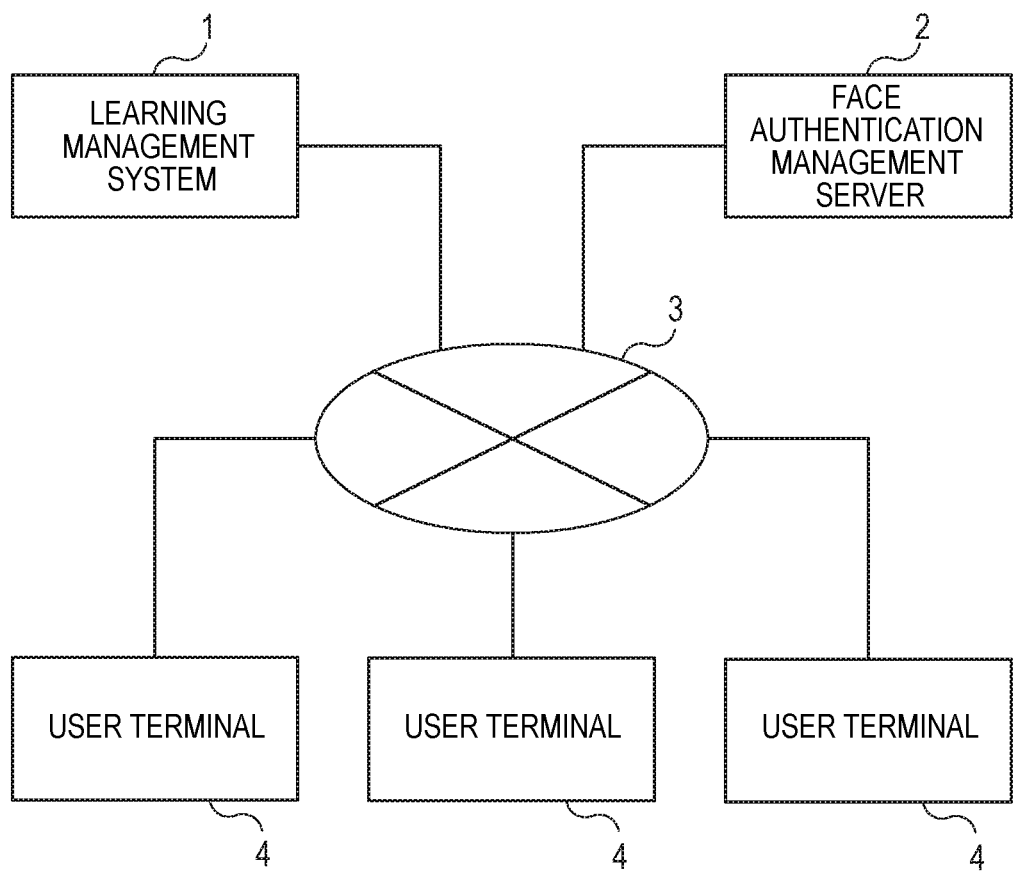
FIG. 1 is a schematic diagram illustrating a general configuration of a first example embodiment.

An example of a remote teaching system over a network will be described as a first example embodiment of the present invention. FIG. 1 is a schematic diagram illustrating a general configuration of the remote teaching system according to the first example embodiment. The remote teaching system includes a learning management system 1, a face authentication management server 2, and user terminals 4. The learning management system 1, the face authentication management server 2, and the user terminals 4 are connected so as to be able to communication with each other via a network 3. Note that, while one learning management system 1, one face authentication management server 2, and a plurality of (three) user terminals 4 are illustrated in FIG. 1, the number of them is not particularly limited. Note that the learning management system 1 that is a target to be accessed by the user terminal 4 may be simply referred to as an access target system.

The learning management system 1 is a system that provides a teaching service to a user who utilizes the user terminal 4 remotely via the network 3 and may be called an e-learning system. The learning management system 1 transmits contents such as a lecture voice, a lecture movie, an explanatory material, a confirmation test of the understanding level, or the like to the user terminal 4. Transmission of such contents may be performed by using technologies such as streaming, progressive download, or the like in which downloading and playback of data are performed simultaneously. Further, the learning management system 1 may further have a function such as accepting a question to a lecturer from a user to perform interactive teaching.

The face authentication management server 2 provides face authentication software used for performing face authentication on a user who intends to access or has accessed the learning management system 1. Although described as being installed in the user terminal 4, the above software may be installed in the face authentication management server 2, the learning management system 1, or other servers. Further, the face authentication management server 2 has a function of providing a policy of face authentication to face authentication software installed in the user terminal 4.

The network 3 is an Internet Protocol (IP) network, a Local Area Network (LAN), or the like. The communication path over the network 3 may be wired, may be wireless, or may be a combination thereof.

The user terminal 4 is a computer having a communication function by which the user receives contents from the learning management system 1. The user terminal 4 may be a desktop Personal Computer (PC), a laptop PC, a tablet PC, a mobile phone, or the like. Further, the user terminal 4 has a camera used for capturing an image of a face of a user accessing the learning management system 1. The user terminal 4 is supplied with a software that performs face authentication of a user from the face authentication management server 2, executes a face authentication program, and thereby functions as a face authentication system.

Note that the learning management system 1 and the face authentication management server 2 may be configured as an integrated system. In this case, in the following description, transmission and reception of information between the user terminal 4 and the learning management system 1 may be replaced with transmission and reception of information between the user terminal 4 and one face authentication management server 2, and transmission and reception of information between the user terminal 4 and the face authentication management server 2 may be replaced with transmission and reception of information between the user terminal 4 and the learning management system 1. Further, the learning management system 1 and the face authentication management server 2 may be configured as a single learning management device having both of the above functions. In this case, in the following description, transmission and reception of information between the user terminal 4 and the learning management system 1 and transmission and reception of information between the user terminal 4 and the face authentication management server 2 may be each replaced with transmission and reception of information between the user terminal 4 and the learning management device.

Figure 2:
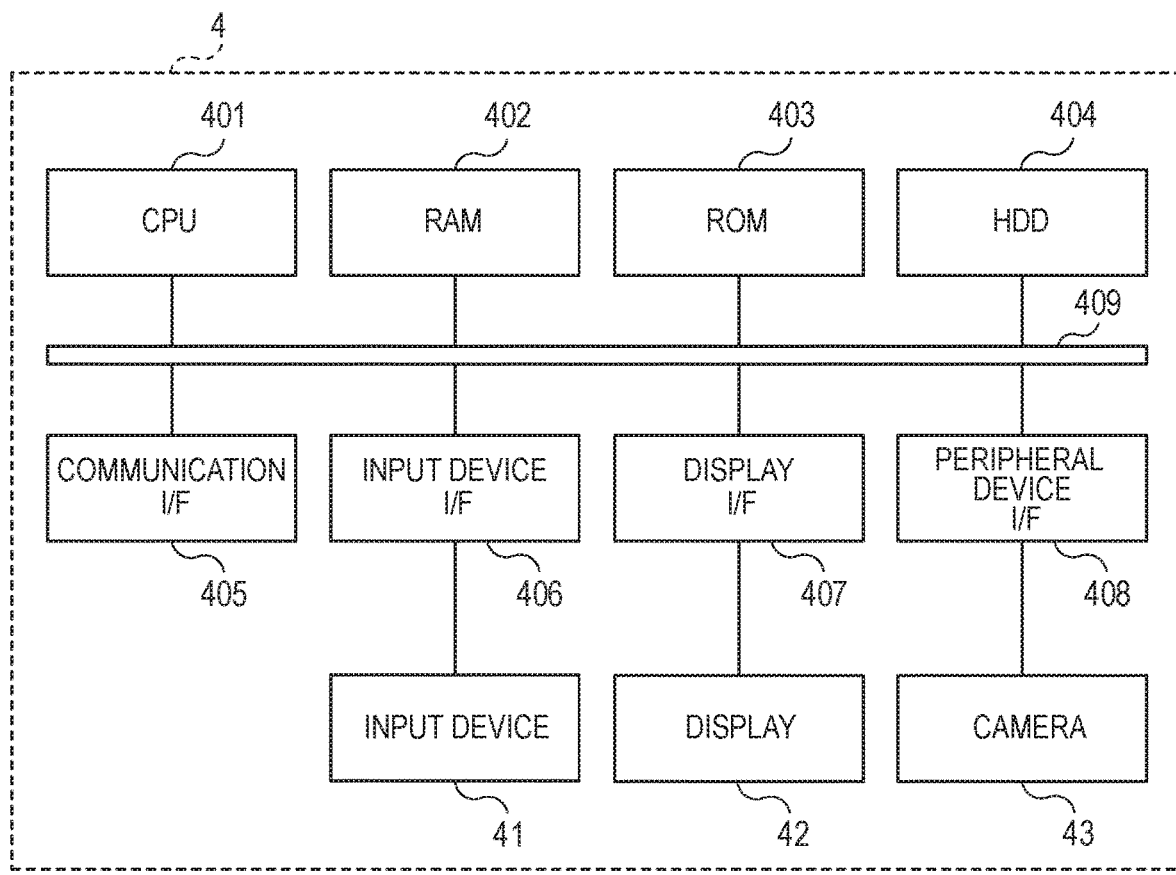
FIG. 2 is a block diagram illustrating a hardware configuration example of a user terminal according to the first example embodiment.

FIG. 2 is a block diagram illustrating a hardware configuration example of the user terminal 4 according to the first example embodiment. To implement functions as a computer that performs calculation and storage, the user terminal 4 has a central processing unit (CPU) 401, a random access memory (RAM) 402, a read only memory (ROM) 403, and a hard disk drive (HDD) 404. Further, the user terminal 4 has, as an interface (I/F), a communication I/F 405, an input device I/F 406, a display I/F 407, and a peripheral device I/F 408. The user terminal 4 further has an input device 41, a display 42, and a camera 43. The CPU 401, the RAM 402, the ROM 403, the HDD 404, the communication I/F 405, the input device I/F 406, the display I/F 407, and the peripheral device I/F 408 are connected to each other via a bus 409.

While respective components forming the user terminal 4 are illustrated as an integrated device in FIG. 2, these components may be formed of a computer and one or more external devices. For example, the input device 41, the display 42, or the camera 43 may be an external device separated from a computer including the CPU 401 or the like.

The CPU 401 has the function of performing a predetermined operation according to a program stored in the ROM 403, the HDD 404, or the like and controlling respective components of the user terminal 4. The RAM 402 provides a temporal memory region necessary for the operation of the CPU 401. The ROM 403 is formed of a non-volatile memory and stores necessary information such as a program used for the operation of the user terminal 4. The HDD 404 is a mass storage device that performs face image data of users, storage of contents received from the learning management system 1, or the like.

The communication I/F 405 is a communication interface based on a standard such as Ethernet (registered trademark), Wi-Fi (registered trademark), or the like, which is a module used for communicating with other devices. The input device 41 is a keyboard, a mouse, a touchscreen, or the like by which the user operates the user terminal 4. The input device I/F 406 is an interface by which the CPU 401 controls the input device 41. The display 42 is a liquid crystal display, an organic light emitting diode (OLED) display, or the like and used for displaying a moving image, a static image, a text, or the like. The display I/F 407 is an interface through which the CPU 401 controls the display 42.

The camera 43 is a device that captures an image of a face of a user who is accessing the learning management system 1. The camera 43 is arranged at a position where the user's face is included within a capturing range when the user is looking at the display 42. For example, the camera 43 may be arranged in the bezel of the display 42. It is desirable that the camera 43 be able to perform capturing with digital data so as to be suitable for a process of face authentication. It is therefore desirable that the camera 43 be a digital camera with a complementary metal oxide semiconductor (CMOS) image sensor, a charge coupled device (CCD) image sensor, or the like. The peripheral device I/F 408 is an interface used for performing control of the camera 43 by the CPU 401, transfer of an image acquired by the camera 43 to the HDD 404, or the like.

Note that the hardware configuration illustrated in FIG. 2 is an example, and a device other than the above may be added, or some of the devices may not be provided. Further, some of the devices may be replaced with another device having a similar function. For example, some of the functions may be provided by another device via a network, or the functions forming the present example embodiment may be distributed in a plurality of devices for implementation. Further, for example, the HDD 404 may be replaced with a solid state drive (SSD) using a semiconductor element such as a flash memory.

Figure 3:
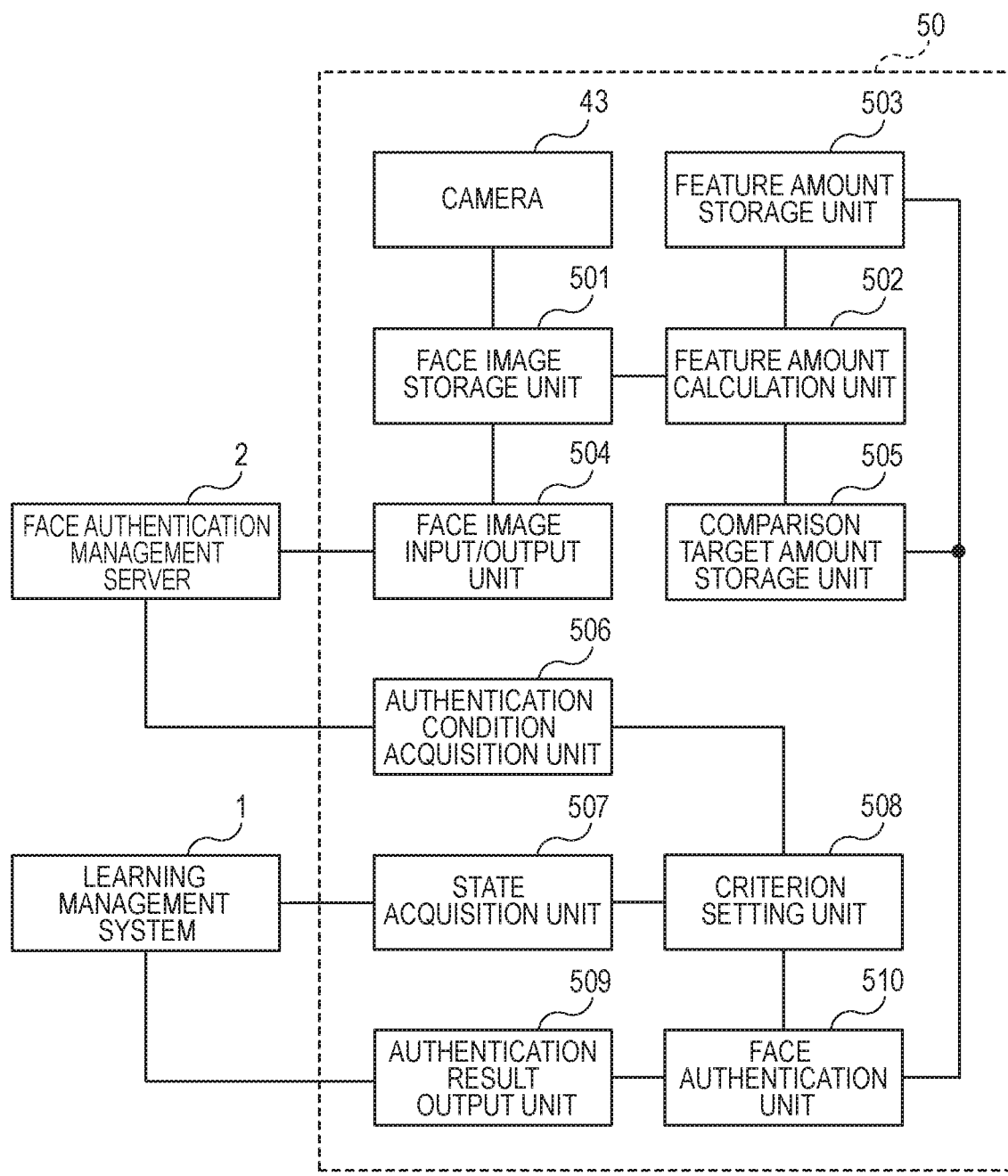
FIG. 3 is a function block diagram of the user terminal according to the first example embodiment.

FIG. 3 is a function block diagram of the user terminal 4 according to the first example embodiment. FIG. 3 illustrates a function block when the CPU 401 of the user terminal 4 executes a program of face authentication software and thereby causes the user terminal 4 to function as a face authentication system 50. The face authentication system 50 has the camera 43, a face image storage unit 501, a feature amount calculation unit 502, a feature amount storage unit 503, a face image input/output unit 504, a comparison target amount storage unit 505, an authentication condition acquisition unit 506, a state acquisition unit 507, a criterion setting unit 508, an authentication result output unit 509, and a face authentication unit 510.

The CPU 401 implements functions of the feature amount calculation unit 502, the criterion setting unit 508, and the face authentication unit 510 by loading and executing a program stored in the ROM 403 or the HDD 404 to the RAM 402. The HDD 404 controlled by the CPU 401 implements functions of the face image storage unit 501, the feature amount storage unit 503, and the comparison target amount storage unit 505. The communication I/F 405 controlled by the CPU 401 implements functions of the face image input/output unit 504, the authentication condition acquisition unit 506, the state acquisition unit 507, and the authentication result output unit 509.

The face image storage unit 501 stores a face image captured by the camera 43 as digital data. The face image storage unit 501 is able to store a plurality of face images acquired at different time, and in this case, the face images may be stored in association with capturing time. Further, when the face authentication system 50 of the present example embodiment may perform face authentication of a plurality of users, the face images may be stored in association with user names.

The feature amount calculation unit 502 performs calculation of a feature amount on a face image stored in the face image storage unit 501. The feature amount calculation unit 502 detects a face region of a user within image data and detects a face feature point. The feature amount calculation unit 502 then calculates a feature amount from data such as the position of the face feature point. In such a way, a face image can be converted into a feature amount in a form suitable for comparison performed by a computer. As a face feature point, for example, a portion that can be easily recognized in a face such as an eye(s), a nose, a mouth is selected. Note that a plurality of feature amounts may be calculated from a single image.

The feature amount storage unit 503 stores feature amount generated by the feature amount calculation unit 502. When an attribute such as capturing time, a user name, or the like is associated with a face image, a feature amount may be stored in association with such an attribute.

The face image input/output unit 504 performs input of a face image from the face authentication management server 2 and output of a face image to the face authentication management server 2. Note that data input or output at the face image input/output unit 504 may be a face image itself of the user or may be information related to a face image such as a feature amount calculated from a face image. FIG. 3 illustrates a block diagram in which a configuration of transmitting or receiving the face image itself is expected as an example, and the face image itself is transmitted or received also in the following description. The face image input/output unit 504 acquires, from the face authentication management server 2, a comparison target image used for comparing a face image of the user who is subjected to face authentication and stores the acquired comparison target image in the face image storage unit 501. As such a comparison target image, an image of a photograph of a user's face attached to an application form when the user applies utilization of the learning management system 1 or the like may be used, for example. Further, the face image input/output unit 504 outputs a face image of the user captured by the camera 43 and stored in the face image storage unit 501 to the face authentication management server 2. The face authentication management server 2 stores the input face image of the user as a log of face authentication management.

The calculation of a feature amount is performed also on the comparison target image stored in the face image storage unit 501 in the same manner as on the face image captured by the camera 43 in the feature amount calculation unit 502. The feature amount of the comparison target image is stored in the comparison target amount storage unit 505. When an attribute such as a user name is associated with a comparison target image, the feature amount may be stored in association with such an attribute.

The authentication condition acquisition unit 506 acquires an authentication condition required for face authentication of a user from the face authentication management server 2. This authentication condition illustrates a policy of face authentication such as correspondence between a state of the learning management system 1 and a criterion of face authentication. Further, the authentication condition may include information related to the frequency of performing face authentication during learning.

The state acquisition unit 507 acquires the state of the learning management system 1. A state of the learning management system 1 may be, for example, a state where the learning management system 1 requests the user to perform login, a state where the learning management system 1 performs a logoff process of the user, a state where the learning management system 1 causes the user to perform learning, a state where the learning management system 1 tests the user for checking the understanding level or the like, or the like.

The criterion setting unit 508 sets a criterion of face authentication based on an authentication condition acquired by the authentication condition acquisition unit 506 and a state of the learning management system 1 acquired by the state acquisition unit 507. Here, the criterion set by the criterion setting unit 508 is set to be different in accordance with the state of the learning management system 1.

The face authentication unit 510 performs face authentication to compare a feature amount of a face image of the user stored in the feature amount storage unit 503 with a feature amount of a comparison target image stored in the comparison target amount storage unit 505 and determine whether or not these images are the image of the same person. At this time, when a similarity degree between the face image of the user and the comparison target image expressed by the difference of the feature amounts exceeds a threshold based on the criterion set by the criterion setting unit 508, the face authentication unit 510 determines that the persons are the same.

The authentication result output unit 509 outputs an authentication result at the face authentication unit 510 to the learning management system 1. The learning management system 1 can use the authentication result as information used for determination necessary for providing remote teaching to the user, such as determining whether or not to transmit a content in accordance with the authentication result.

Figure 4:
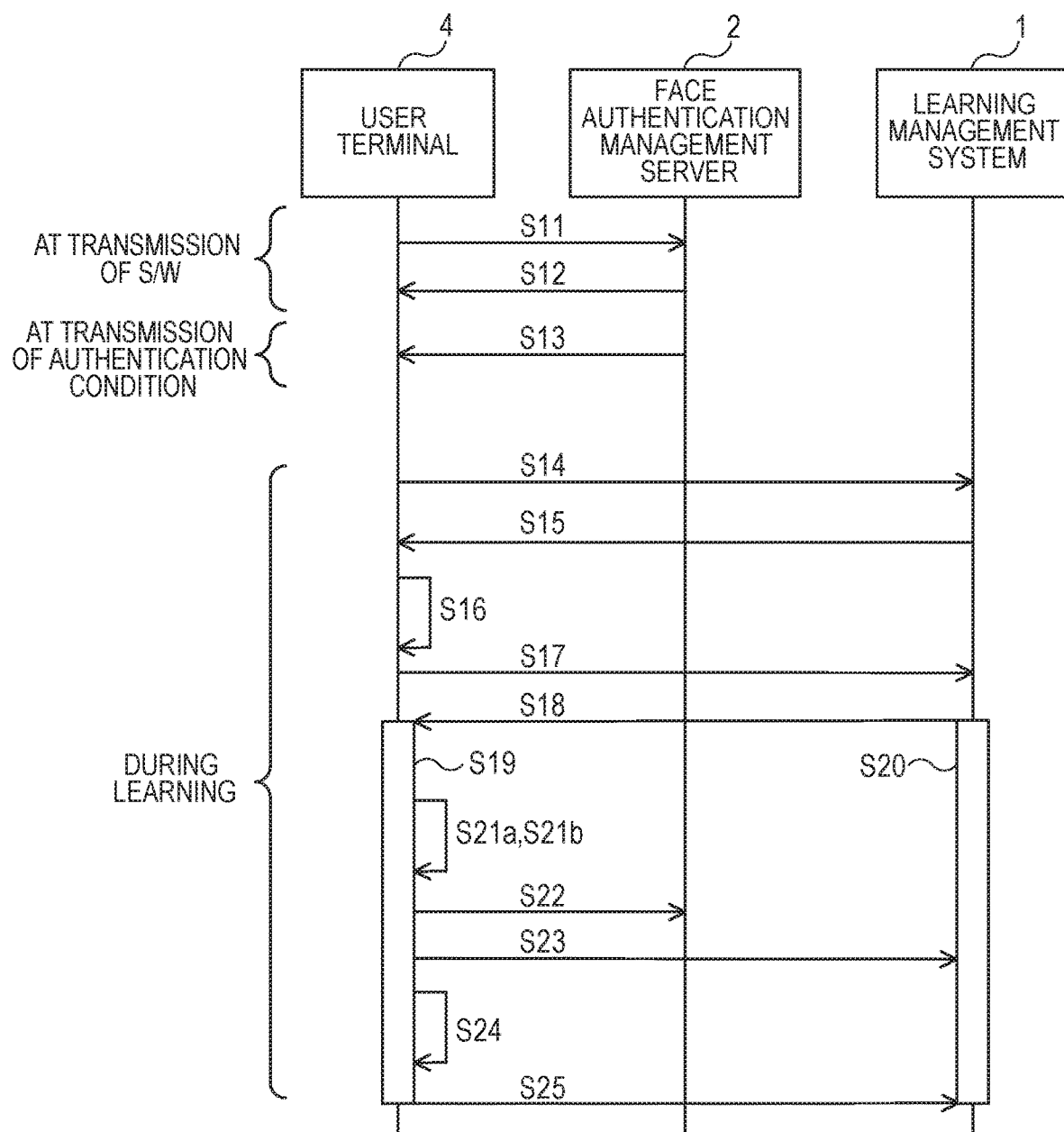
FIG. 4 is sequence diagram illustrating a process of remote teaching according to the first example embodiment.

FIG. 4 is a sequence diagram illustrating the process in the user terminal 4, the face authentication management server 2, and the learning management system 1 in the remote teaching according to the first example embodiment. FIG. 4 illustrates the operation of transmitting software (S/W) used for the operation of the face authentication system 50 from the face authentication management server 2 to the user terminal 4, the operation of transmitting an authentication condition from the face authentication management server 2 to the user terminal 4, and the operation of the user terminal 4, the face authentication management server 2, and the learning management system 1 during learning.

The operation at transmission of the face authentication software will be described. In step S11, the user terminal 4 requests transmission of software from the face authentication management server 2. In step S12, the face authentication management server 2 transmits face authentication software to the user terminal 4 in response to the request. The face authentication software is installed in the user terminal 4, and the user terminal 4 executes this and thereby functions as the face authentication system 50. Note that the face authentication software that causes the user terminal 4 to function as the face authentication system 50 may be downloaded and installed in advance to the user terminal 4.

The operation at transmission of an authentication condition will be described. In step S13 after the face authentication software is installed in the user terminal 4, the face authentication management server 2 transmits an authentication condition to the user terminal 4. As described above, this authentication condition is used for setting of a criterion in face authentication or the like. Note that the timing when the process of step S13 is performed can be suitably determined. For example, step S13 may be repeated at a predetermined cycle, may be performed at the time of change of an authentication condition determined by the face authentication management server 2, may be performed in response to a request of the user terminal 4, or may be performed at the same time as or immediately after transmission of face authentication software.

Figure 5:
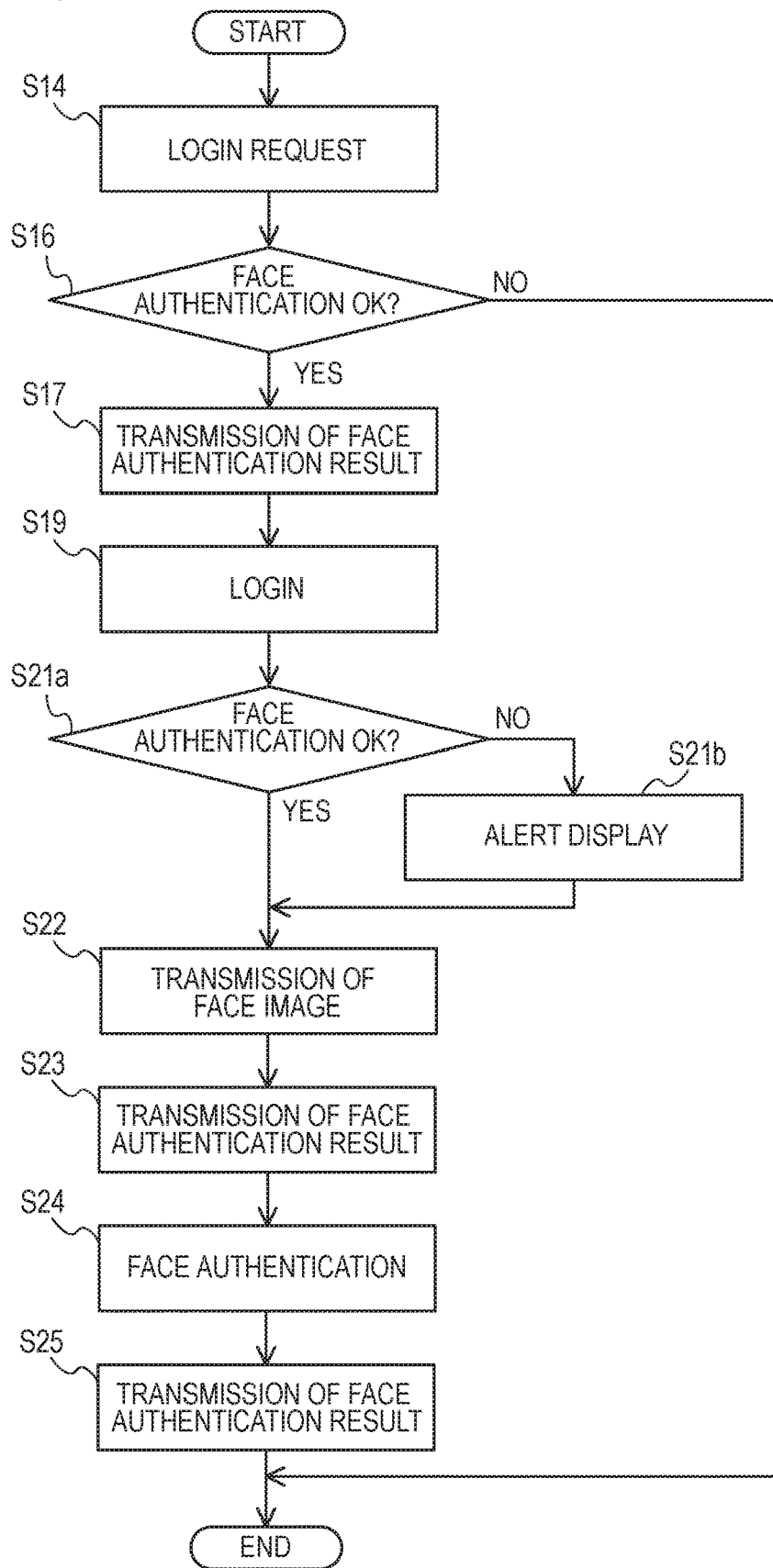
FIG. 5 is a flowchart illustrating a process during learning in the user terminal according to the first example embodiment.

FIG. 5 is a flowchart illustrating a process during learning in the user terminal 4 according to the first example embodiment. In the following description, the operation during learning will be described with reference to FIG. 4 and FIG. 5 each other. In step S14, the user terminal 4 requests the learning management system 1 for login. In step S15, the learning management system 1 requests information necessary for identifying the user from the user terminal 4 and requests the face authentication system 50 of the user terminal 4 to perform face authentication of the user. Here, the information necessary for identifying the user may include a user identifier (ID), for example. In addition, the learning management system 1 may further request information used for authentication, such as a password, from the user terminal 4.

In step S16, the camera 43 captures a face image of the user, the face authentication unit 510 of the face authentication system 50 performs face authentication of the user based on the similarity degree between the face image of the user and the comparison target image. At this time, the learning management system 1 is in a state to accept a face authentication result for determining login permission. In the following, this state may be referred to as a first state. The state acquisition unit 507 acquires information indicating that the learning management system 1 is in the first state, and the criterion setting unit 508 sets a criterion in accordance with the first state. The face authentication unit 510 performs face authentication in accordance with this criterion. When the user of the user terminal 4 is recognized as the user in question registered in the learning management system 1, the process proceeds to step S17 (step S16, YES). When the user of the user terminal 4 is determined to be a different person from the user registered in the learning management system 1 or when face image recognition itself fails, login is not permitted, and thus the process ends (step S16, NO). Note that acquisition of a comparison target image and calculation of a feature amount in the user terminal 4 may be performed in advance before step S14.

Note that the camera 43 may capture a face image of the user and the face authentication unit 510 may perform face authentication of the user not only at the time of login but also at the start of a content. Also at this time, the learning management system 1 is in a state of accepting a face authentication result used for determining whether or not to permit start of the content, which may be included in the first state described above. The expression "at the start of a content" includes at the start of playback of a delivered content and at the start of playback from each chapter within a content. Therefore, when one content is divided into four charters of the first chapter to the fourth chapter, for example, "at the start of a content" may be at the start of the first chapter, at the start of the second chapter, at the start of the third chapter, and at the start of the fourth chapter.

In step S17, the user terminal 4 transmits a signal indicating that the face authentication is allowed by the learning management system 1. Note that such an indication may be transmitted similarly when the user of the user terminal 4 is determined to be a different person from the user registered in the learning management system 1 or when face image recognition itself fails in step S16.

In step S18, the learning management system 1 authorizes login to the user terminal 4 and starts transmission of a content in accordance with the request from the user terminal 4. In FIG. 4, each of rectangles labeled with steps S19 and S20 illustrates a period in which the user terminal 4 has logged in the learning management system 1. At a predetermined timing in this period, the learning management system 1 transmits a content to the user terminal 4 (not illustrated). For example, when the content is a lecture movie transmitted by streaming or progressive download, the learning management system 1 can continue transmission of the lecture movie in a period in which the user performs learning.

Note that, in the first authentication such as at login, at the start of a content, or the like, face authentication may be omitted, identity verification may be performed by using a user ID, a password, or the like, and a photograph of a user's face to be used as a comparison target image in future face authentication may be captured. In such a scheme, it is not necessary to acquire a comparison target image from the face authentication management server 2. The acquired comparison target image is used in face authentication performed after the first authentication (for example, step S21a described later).

In step S21a within a login period, the camera 43 captures a face image of the user, and the face authentication unit 510 performs face authentication of the user. Step S21a is performed at a predetermined timing defined by an authentication condition. At this time, the learning management system 1 is in a state of accepting a face authentication result of the logged in user. Hereinafter, this state may be referred to as a second state. The state acquisition unit 507 acquires information that the learning management system 1 is in the second state, and the criterion setting unit 508 sets a criterion in accordance with the second state. The face authentication unit 510 performs a face authentication by using this criterion. When the user of the user terminal 4 is recognized to be the user in question registered in the learning management system 1, the process proceeds to step S22 (step S21a, YES). If the user of the user terminal 4 is determined to be a different person from the user registered in the learning management system 1 or if the face image recognition itself fails ((step S21a, NO), the process proceeds to step S21b.

In step S21b, the user terminal 4 causes the display 42 to display a message for an alert. A state of identity verification with face authentication being unable to be made may occur when the attitude of attending a lecture is unenthusiastic such as when the user has left its seat, when the user is looking at something else, or the like, for example. The reason for displaying an alert is to eliminate such a state of the unenthusiastic attitude of attending a lecture and urge the user to succeed in face authentication. Note that this alert display is not essential, and a process such as to force logoff may be employed, for example, or a process such as to accumulate the history of the state of the attitude of attending a lecture in the log may be employed without providing an alert to the user.

In step S22, the user terminal 4 transmits a face image of the user to the face authentication management server 2 in accordance with the result of the face authentication. This face image is stored in the face authentication management server 2 as a log of the face authentication. The manager of the face authentication management server 2 is able to visually check the face image stored in the face authentication management server 2 and check whether or not the face authentication is properly performed, if necessary. In step S23, the user terminal 4 transmits the result of the face authentication to the learning management system 1. The learning management system 1 can perform various operations using such a result of face authentication. For example, the learning management system 1 may perform a process to force logoff, may perform a process to accumulate the history of the state of the attitude of attending a lecture in the log, or may instruct the user terminal 4 to display an alert message. Further, as another example, the learning management system 1 may temporally stop playback of a content on the user terminal 4 in accordance with a result of face authentication. Playback of the stopped content is resumed when the face authentication is allowed. Note that a result of face authentication that triggers various operations described above performed by the learning management system 1 may include a case where the face authentication is not allowed or a case where face image recognition fails.

Note that, while transmission of a face image in step S22 may be performed to be used for visual check when the face authentication is not allowed, the transmission may be performed to be used for saving a log also when the face authentication is allowed. Further, the user terminal 4 may transmit a face image as a log at the start of each chapter or at the end of each chapter of a content. Further, while the user terminal 4 may transmit a face image in real time at the start or at the end of each chapter, the user terminal 4 may transmit a plurality of face images at once at the timing when the last chapter of a content ends. Also when being configured to monitor substantially all the time the user by repeating the processes of steps S21a, S21b, and S22, and S23 as described later, the user terminal 4 may transmit a face image every time or may transmit a plurality of face images at once at the end of a content or at the time of logoff. Accordingly, the manager of the face authentication management server 2 may visually check in real time at the timing when an image is transmitted or may visually check transmitted images collectively in later time.

The processes of steps S21a, S21b, S22, and S23 described above may be performed multiple times repeatedly within a login period. For example, the user can be monitored substantially all the time by performing the above process at a constant cycle such as performing the above process once 1 second.

Step S24 illustrates an operation when the user of the user terminal 4 finishes learning and performs operation of logoff on the user terminal 4. In a logoff process, the camera 43 captures a face image of the user, and the face authentication unit 510 performs face authentication of the user again. At this time, the learning management system 1 is in a state of accepting a face authentication result at the time of logoff of the user who has been logged in. In the following, such a state may be referred to as a third state. The state acquisition unit 507 acquires information indicating that the learning management system 1 is in the third state, and the criterion setting unit 508 sets a criterion in accordance with the third state. The face authentication unit 510 performs face authentication by using this criterion.

Note that, not only at the time of logoff, but also at the end of a content, the camera 43 may capture a face image of the user, and the face authentication unit 510 may perform face authentication of the user again in a similar manner. The learning management system 1 is also in a state of accepting a face authentication result and may be included in the third state described above. The expression "at the end of a content" includes at the end of playback of one delivered content and at the end of playback of each chapter within the content. Therefore, when one content is divided into four chapters of the first chapter to the fourth chapter, for example, "at the end of a content" may be at the end of the first chapter, at the end of the second chapter, at the end of the third chapter, and at the end of the fourth chapter.

In step S25, the user terminal 4 transmits a signal indicating a result of face authentication to the learning management system 1. The user terminal 4 then logs off the learning management system 1, and the process of the present remote teaching ends. The learning management system 1 can use the result of the face authentication at logoff for determination of whether or not to admit the history of attending a lecture, for example. Further, when the face authentication is not allowed at logoff, the user terminal 4 may again perform face authentication of the user.

Figure 6:
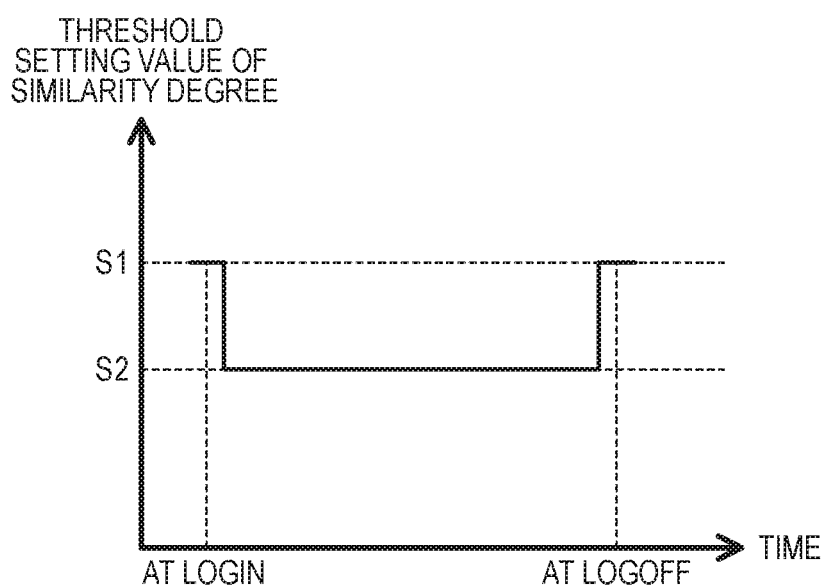
FIG. 6 is a graph illustrating a criterion of face authentication according to the first example embodiment.

The criterion of face authentication in the first state, the second state, and the third state described above will now be described. FIG. 6 is a graph illustrating an example of a criterion of face authentication according to the first example embodiment. The horizontal axis of FIG. 6 represents time including the time of login to logoff, and the vertical axis of FIG. 6 represents a setting value of a threshold of a similarity degree between an acquired face image of the user and a comparison target image. It is determined that both persons in the images are the same when this similarity degree exceeds the threshold, and it is determined that both persons in the images are not the same when the similarity degree is less than or equal to the threshold. That is, a higher threshold causes a strict determination of face authentication to be performed.

In FIG. 6, "at login" corresponds to the first state in step S16 described above, "at logoff" corresponds to the third state in step S21 described above. A period in a logged-in state between "at login" and "at logoff" corresponds to the second state in step S21a described above. Here, as illustrated in FIG. 6, a threshold S1 of the similarity degree used as a criterion of face authentication at login is set higher than a threshold S2 of the similarity degree used as a criterion of face authentication in a logged-in state. The reason why the threshold is set higher at login is that it is necessary to strictly determine whether or not a person trying login is the registered user for the purpose of preventing unauthorized login. On the other hand, since identity verification of the user has been made at login, a need to perform identity verification of the user in a logged-in state is not so high. The face authentication in a logged-in state intends to urge the user to be enthusiastic in attending the lecture, for example. In such a way, strictness of determination is not highly required in a logged-in state. Rather, to reduce the frequency of occurrence of erroneous determination of rejection of the correct person, it is desirable that the threshold be not too high. Therefore, the threshold is set with the level relationship (S1>S2) as illustrated in FIG. 6.

Note that, as illustrated in FIG. 6, the threshold S1 of the similarity degree used as a criterion of face authentication at logoff is set higher than the threshold S2 of the similarity degree used as a criterion of face authentication in a logged-in state period. Although this configuration is not essential, the reason thereof is as below. Since the threshold of face authentication in a logged-in state is set lower, there is a likelihood of impersonation (a dummy attending a lecture) in which the user is replaced with another person during attending a lecture. Thus, it is desirable to perform identity verification again at logoff for the purpose of reliable check of attendance at a lecture. Here, since the user is looking at the screen of the display 42 in order to perform a logoff operation at logoff, the face of the user is within a capturing range, and erroneous determination of rejection of the correct person is less likely to occur. Note that, while the threshold of the similarity degree at login and the threshold of the similarity degree at logoff are the same value S1 in FIG. 6, this is not essential, and these thresholds may be different values from each other.

Further, when face authentication of the user is performed at the start of a content (including the start of each chapter), the threshold S1, which is higher than the threshold S2 of the similarity degree used as a criterion of face authentication in a logged-in state, is used as a criterion of face authentication in a similar manner to the case of being used at login described above. With face authentication using a criterion of the high threshold S1 being performed not only at login and at logoff but also at the start of a content, impersonation or the like can be more reliably prevented. Note that it is not essential to use the threshold S1 always at the start of each chapter as a criterion. For example, when it is estimated that a playback environment such as a place, time, or the like where a content is played back has changed based on position information of the user terminal 4, network connection related information, the time interval of the start of a content, or the like, face authentication using the threshold S1 as a criterion may be performed every time each chapter starts, and when it is estimated that the playback environment has not changed, face authentication using the threshold S2 as a criterion may be performed. Thereby, when the user terminal 4 is a laptop PC, a tablet PC, or the like, appropriate face authentication can be performed even in a case where a playback environment such as a place, time, or the like where a content is played back may change. Note that the position information of the user terminal 4 may be the position of the user terminal 4 acquired by a Global Positioning System (GPS), for example. The network connection related information of the user terminal 4 may be an IP address, for example.

When a comparison target image is acquired without face authentication being performed in the first authentication at login, at the start of a content, or the like, the high threshold S1 may be used as a criterion of face authentication at the first face authentication after acquisition of the comparison target image, and the threshold S2 may then be used as a criterion of face authentication in a logged-in state.

Further, when face authentication of a user is performed at the end of a content (including the end of each chapter), the threshold S1, which is higher than the threshold S2 of the similarity degree used as a criterion of face authentication in a logged-in state, is used as a criterion of face authentication in a similar manner to the case of being used at logoff described above. By performing face authentication using the high threshold S1 as a criterion not only at login, at logoff, and at the start of a content but also at the end of a content, it is possible to prevent impersonation or the like in a more reliable manner.

Further, with respect to face authentication used as a condition of resuming playback of a content when playback of a content at the user terminal 4 is temporally stopped due to a result of face authentication, the threshold S1, which is higher than the threshold S2 of the similarity degree used as a criterion of face authentication in a logged-in state, is used as a criterion of face authentication in a similar manner to the case of being used at login described above.

As described above, according to the present example embodiment, by differentiating a criterion of face authentication in accordance with the state of access target system to be accessed by the user, it is possible to provide a face authentication system that can set a criterion of face authentication in a more suitable manner.

A typical application example of the configuration of the present example embodiment will be arranged and described along a flow when the user performs learning. When the user receives a content from the learning management system 1 to perform learning, the following four processes are mainly performed. (a) Login to the learning management system 1 (corresponding to step S19). (b) Selection of a content from a lecture menu and start of playback of the content. (c) End of playback of the content. (d) Logoff from the learning management system 1 (if necessary). While face authentication may be performed in any case in the processes from (a) to (d), the face authentication may be omitted. While the threshold of the similarity degree used as a criterion of face authentication can be differentiated from each other in the processes of (a) to (d) with application of the present example embodiment, typically, the threshold S1 of the similarity degree used as a criterion of face authentication in the above (a) and (c) may be set higher than the threshold S2 of other cases.

Second Example Embodiment

An example in which a criterion of face authentication is changed from the first example embodiment will be described as a second example embodiment. Since the basic configuration such as a block diagram of the face authentication system 50 is the same as that of the first example embodiment, features different from those of the first example embodiment will be mainly described below, and the duplicated description will be omitted or simplified.

The learning management system 1 of the present example embodiment has a function of instructing a user to take a test in addition to the function of instructing the user to perform learning. For example, this test is an understanding level check test for checking whether or not the user has deeply understood the learning content, and a result of the test may be used for determination as to whether or not to admit the attendance at a lecture.

Figure 7:
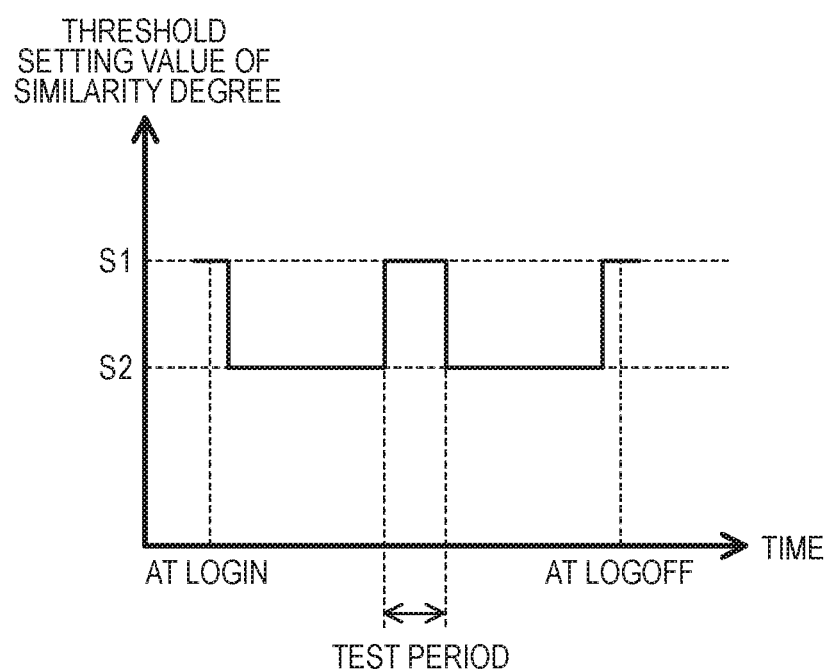
FIG. 7 is a graph illustrating a criterion of face authentication according to a second example embodiment.

FIG. 7 is a graph illustrating an example of a criterion of face authentication according to the second example embodiment. As illustrated in FIG. 7, "test period" is provided in a logged-in state. During a test period, the learning management system 1 transmits data necessary for a test, such as a test question, an answer form, or the like, to the user terminal 4, and the user terminal 4 displays the data on the display 42 to instruct the user to take the test. Therefore, in a logged-in state, the learning management system 1 is able to operate in a state of instructing the user to take the test and a state of instructing the user to perform learning. In the following, a state of instructing the user to take a test may be referred to as a fourth state, and a state of instructing the user to perform learning may be referred to as a fifth state. As illustrated in FIG. 7, the threshold S1 of the similarity degree used as a criterion of face authentication in the test period is set higher than the threshold S2 of the similarity degree used as a criterion of face authentication during learning. The reason why the threshold is set higher in the test period is that a need for identity verification is higher than during learning in order to prevent cheating such as impersonation (a dummy taking a test) in which the user is replaced with another person in the test period. Note that, while the threshold of the similarity degree at login, the threshold of the similarity degree at logoff, and the threshold of the similarity degree in a test period are the same value S1 in FIG. 7, this is not essential, and these thresholds may be different values from each other.

As described above, according to the present example embodiment, cheating in a test can be prevented.

Note that, while the values of the threshold of the similarity degree used as a criterion of face authentication are different between the test period and during learning in the example described above, a setting scheme of a criterion may be other than the above. For example, the frequency of performing face authentication with the threshold S1 may be different between the test period and during learning. For example, it is also possible to prevent cheating in a test by setting the frequency of face authentication in a test period to be higher than the frequency of face authentication during learning such as performing face authentication with the threshold S1 every 30 seconds in the test period and performing face authentication with the threshold S1 every 10 minutes during learning.

Third Example Embodiment

A modified example regarding alert display displayed after face authentication during learning will be described as a third example embodiment. The present example embodiment is an example embodiment in which the alert display in step S21*b* of FIG. 4 and FIG. 5 is changed or more detailed from that of the first example embodiment. Thus, only the features different from those of the first example embodiment will be described below, and the duplicated description will be omitted or simplified.

Figure 8:
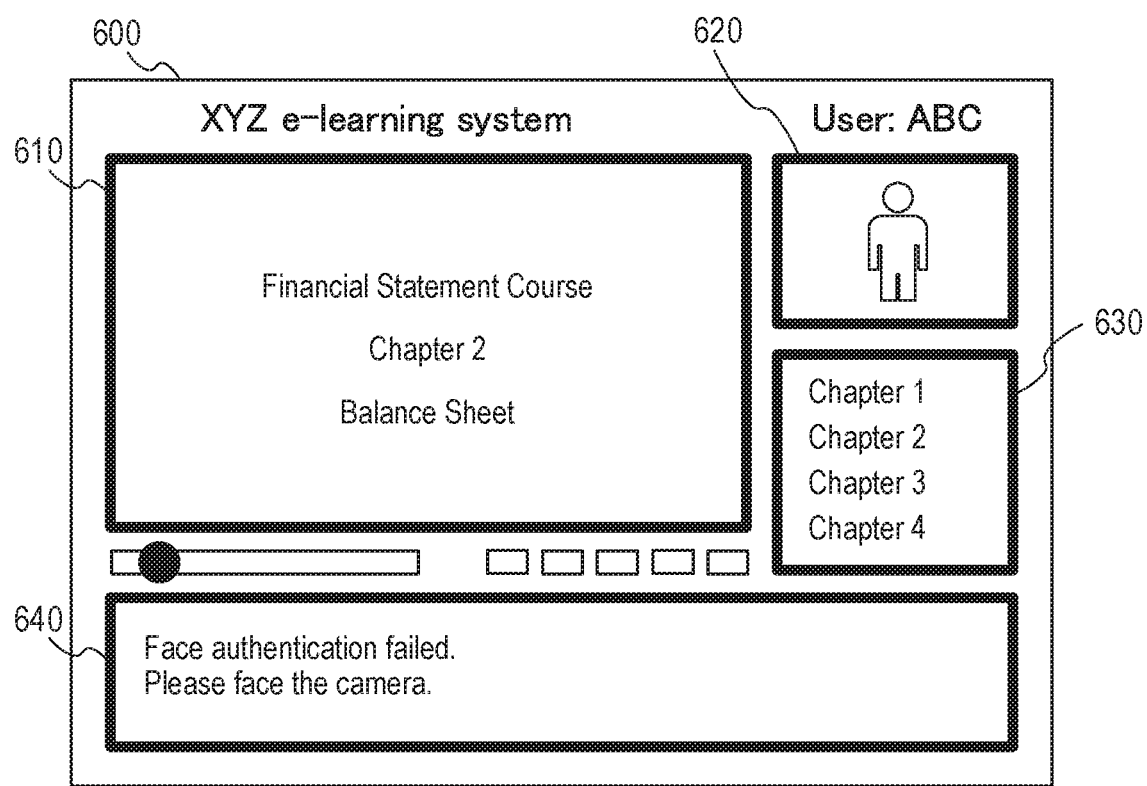
FIG. 8 is a diagram illustrating a screen display example on a display according to a third example embodiment.

FIG. 8 is a diagram illustrating a screen display example on the display 42 in the present example embodiment. A lecture material display window 610, a lecturer image display window 620, a lecture information display window 630, and a message display window 640 are depicted within display screen 600 illustrated in FIG. 8. A lecture material is displayed in the lecture material display window 610. An image of a lecturer who is providing a lecture is displayed in the lecturer image display window 620. Information on the lecture is displayed on the lecturer information display window 630 in this example, the chapter arrangement of the lecture is displayed. A message to the user is displayed in the message display window 640. Further, information such as a product name of the learning management system 1 (XYZ e-learning system), a user name (ABC), or the like may be displayed outside the window within the display screen 600.

In the present example embodiment, in accordance with the result of the face authentication in step S21*a*, an alert text or the like is displayed in the message display window 640 on the display 42. As a result of face authentication, there are three conceivable cases: a case where recognition of a face image is successful and the face authentication is allowed, a case where recognition of a face image is successful and the face authentication is not allowed, and a case where recognition of a face image fails. In accordance with these three results, different messages are displayed in the message display window 640. When recognition of a face image is successful and the face authentication allowed, for example, "Face authentication was successful" is displayed in the massage display window 640 in order to notify the user that the race authentication is allowed (first notification). When recognition of a face image is successful and the face authentication is not allowed, there is a likelihood of the learning management system 1 being used by impersonation. Accordingly, to urge stop of the impersonation, "Identity verification of Mr./Ms. ABC failed. This lecture can be taken by Mr./Ms. ABC only" is displayed in the message display window 640 (second notification), for example. When recognition of a face image fails, there is a likelihood of a state of an unenthusiastic attitude of attending a lecture such as a state where the user has left its seat or the user is looking at something else. Thus, to instruct the user to face the screen and eliminate the state of the unenthusiastic attitude of attending a lecture, "Face authentication failed. Please face the camera" is displayed as illustrated in FIG. 8 in the message display window 640 (third notification), for example.

Note that the display of the present example embodiment is not limited to those using a text message but may be those changing the color of a part of the display screen 600 in accordance with a face authentication result, for example. For example, it is possible to allow the user to recognize the face authentication result by using a difference in color, such as green when recognition of a face image is successful and the face authentication is allowed, red when recognition of a face image is successful and the face authentication is not allowed, and yellow when recognition of a face image fails. In this example, since the massage display window 640 may not be provided, the area of the display screen 600 can be effectively utilized. Further, by performing a change of color and notification of a message at the same time, it is possible to cause the user to pay attention in a more reliable manner.

Further, the user may be notified by a voice message, an alarm sound, or the like by using an audio output unit such as a speaker, a headphone, or the like provided to the user terminal 4. Also in this case, since the message display window 640 may not be provided, the area of the display screen 600 can be effectively utilized. As discussed above, in the present example embodiment, the notification scheme is not limited as long as notification is provided to the user in accordance with a face authentication result, and any notification scheme such as a text, color, a voice, or the like may be used.

As described above, according to the present example embodiment, a content in accordance with a result of face authentication of the user is displayed or the like to notify the user of the face authentication result, and thereby an inappropriate state in attending a lecture can be eliminated.

Fourth Example Embodiment

As a fourth example embodiment, a modified example regarding an alert display displayed after face authentication during learning will be described. The present example embodiment is an example embodiment in which transmission of a face image in step S22 of FIG. 4 and FIG. 5 is changed or more detailed from the first example embodiment. Thus, only the features different from those of the first example embodiment will be described, and the duplicated description will be omitted or simplified.

Figure 9:
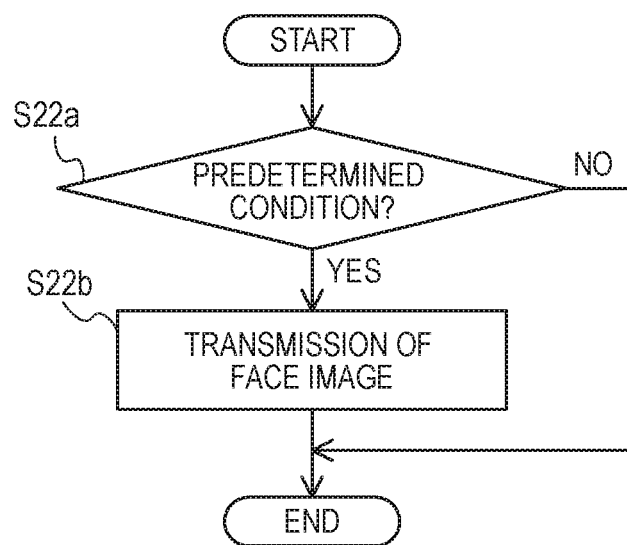
FIG. 9 is a flowchart illustrating a process of face image transmission according to a fourth example embodiment.

The present example embodiment provides a more specific example of the condition of transmitting a face image of the user acquired by the user terminal 4 to the face authentication management server 2. FIG. 9 is a flowchart Illustrating a process of face image transmission according to the fourth example embodiment. In the present example embodiment, processes of steps S22a and S22b of FIG. 9 are performed instead of step S22 of FIG. 4 and FIG. 5.

In step S22a, the CPU 401 of the user terminal 4 determines whether or not a predetermined condition is satisfied for a result of face authentication. If the predetermined condition is satisfied, the process proceeds to step S22b (step S22a, YES), the face image input/output unit 504 of the user terminal 4 transmits a face image of the user to the face authentication management server 2 (step S22b). If the predetermined condition is not satisfied, the face image input/output unit 504 of the user terminal 4 does not transmit a face image of the user to the face authentication management server 2 (step S22a, NO).

In this example, the predetermined condition may be that the face authentication was not allowed for predetermined continuous times or that the face authentication was not allowed for predetermined times within a predetermined period, for example. That is, a face image is not always transmitted when the face authentication was not allowed, the condition includes requirement of face authentication being not allowed for multiple times. One of the purposes of transmitting a face image to the face authentication management server 2 outside the user terminal 4 is to store the face image in the face authentication management server 2 as a log and thereby enable the manager of the face authentication management server 2 to visually check the face image if necessary. Thereby, the manager is able to check whether or not face authentication is properly performed. The manager is not required to check all the face images all the time but may perform the check, if necessary, when face authentication is questionable. It is therefore not essential to pre-store ail the face images. In such a way, it is not necessary to transmit a face image of the user every time, but it is often sufficient to transmit a face image only when there is likely to be a problem, such as when face authentication is not allowed continuously. On the other hand, in the configuration in which data of a face image is transmitted every time, a problem of increase in the communication data amount, increase in processing time, and the like may occur. Therefore, with a configuration in which a face image is transmitted only when a predetermined condition is satisfied, it is possible to reduce the communication data amount and shorten the processing time. Note that, when being configured to monitor the user substantially all the time by repeating the processes of steps S21a, S21b, S22, and S23, the user terminal 4 may transmit a face image every time a predetermined condition is satisfied or may transmit a plurality of face images at once at the end of a content or at logoff.

Note that the case of "face authentication is not allowed" of the predetermined condition described above may include a case where recognition of a face image falls. The case where recognition of a face image fails refers to a case where a face of a person facing the front of a capturing region is not successfully detected, for example, which may be a case where the user has left its seat, looks away, or the like.

As described above, according to the present example embodiment, by transmitting a face image from the user terminal 4 to the face authentication management server 2 only when a predetermined condition satisfied, it is possible to reduce the communication data amount and shorten the processing time.

Fifth Example Embodiment

As a fifth example embodiment, a modified example regarding acquisition of comparison target image will be described. The present example embodiment is an example embodiment in which an acquisition method of a comparison target image is changed or more detailed from the first example embodiment. Thus, only the features different from those of the first example embodiment will be described, and the duplicated description will be omitted or simplified.

Figure 10:
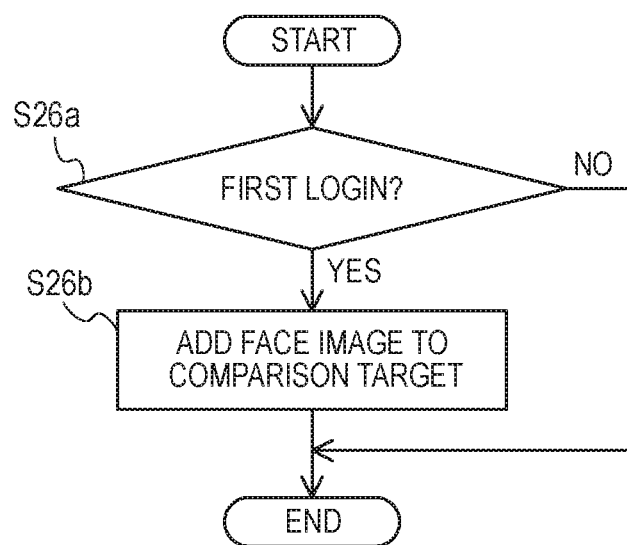
FIG. 10 a flowchart illustrating a process of adding a comparison target according to a fifth example embodiment.

The present example embodiment relates to a process when the user terminal 4 logs in the learning management system 1 for the first time. FIG. 10 is a flowchart illustrating a process of adding a comparison target according to the fifth example embodiment. In the present example embodiment, the processes of steps S26a and 26b of FIG. 10 are performed at any timing between login of step S19 to logoff of step S24 of FIG. 1 and FIG. 5.

In step S26a, the CPU 401 of the user terminal 4 determines whether or not login is the first time. If the login is the first time, the process proceeds to step S26b (step S26a, YES). In step S26b, a face image acquired at the first login is added to comparison targets so as to be able to be used as a comparison target in face authentication at the second and subsequent login. Specifically, in the face image storage unit 501, a face image acquired and stored at the first login is handled as a comparison target image. Furthermore, the CPU 401 causes the comparison target amount storage unit 505 to store, as a feature amount of the comparison target image, a feature amount generated at the first login and stored in the feature amount storage unit 503. When the login is the second or subsequent login in step S26a, the process ends (step S26a, NO). Note that a step of the user terminal 4 transmitting a comparison target image added in the face authentication management server 2 may be further added.

As described in the illustration of the first example embodiment, a photograph captured in advance such as an image of a photograph of the user's face attached to an application form may be used for a comparison target image, for example. However, there may be a difference between a face image of a photograph submitted in advance and a face image of the user at the time of login due to a temporal change or the like. Accordingly, by adding an image captured at the first login or the feature amount as a comparison target, it is possible to perform face authentication using the image closer to the actual face as a comparison target and thus improve the accuracy of face authentication. Furthermore, there is an advantage of avoiding being affected by a difference in lighting or a background between an image of the user, such as a photograph attached to the application form, and an image of the user at the time of login. Typically, the background of a photograph attached to an application form is often plain, and the brightness of lighting is often suitably adjusted. In contrast, since various lighting and backgrounds may be applied in the image of the user at the time of login, there is a likelihood of deterioration of the accuracy of face authentication due to the difference in lighting or a background between both the images. Further, in the image of the user at the time of login, there may be a poster in the background or there may be a photograph of a face of a person or a pattern which may be misrecognized as the face of a person in the clothes, this may be a factor of deterioration of the accuracy of face authentication. In contrast, in the present example embodiment, since it is possible to perform face authentication with lighting, a background, clothes, or the like being the same to some degrees and thus improve the accuracy of face authentication by adding an image or a feature amount captured at the time of login as a comparison target.

Note that a comparison target added at the first login may be replaced with a comparison target such as a photograph attached to an application form prepared in advance, and both the comparison targets including the comparison target prepared in advance may be used as the comparison target. When both the comparison targets are used, the process of face authentication may employ a scheme of assuming face authentication to be successful if the face authentication is successful for any one of the comparison targets, for example.

Note that the present example embodiment may be configured to omit face authentication, perform identity verification using a user ID, a password, or the like and capture a face image of the user at login or at the start of a content, and use the captured face image as the comparison target image in the subsequent face authentication.

As described above, according to the present example embodiment, it is possible to improve the accuracy of face authentication by adding a face image at the first login as a comparison target.

The same process as the process performed at the first login described above may be performed at the start of a content. In this case, a face image acquired at the start of a content (or at the start of each chapter of a content) can be used as a comparison target image during the content being delivered.

Sixth Example Embodiment

Figure 11:
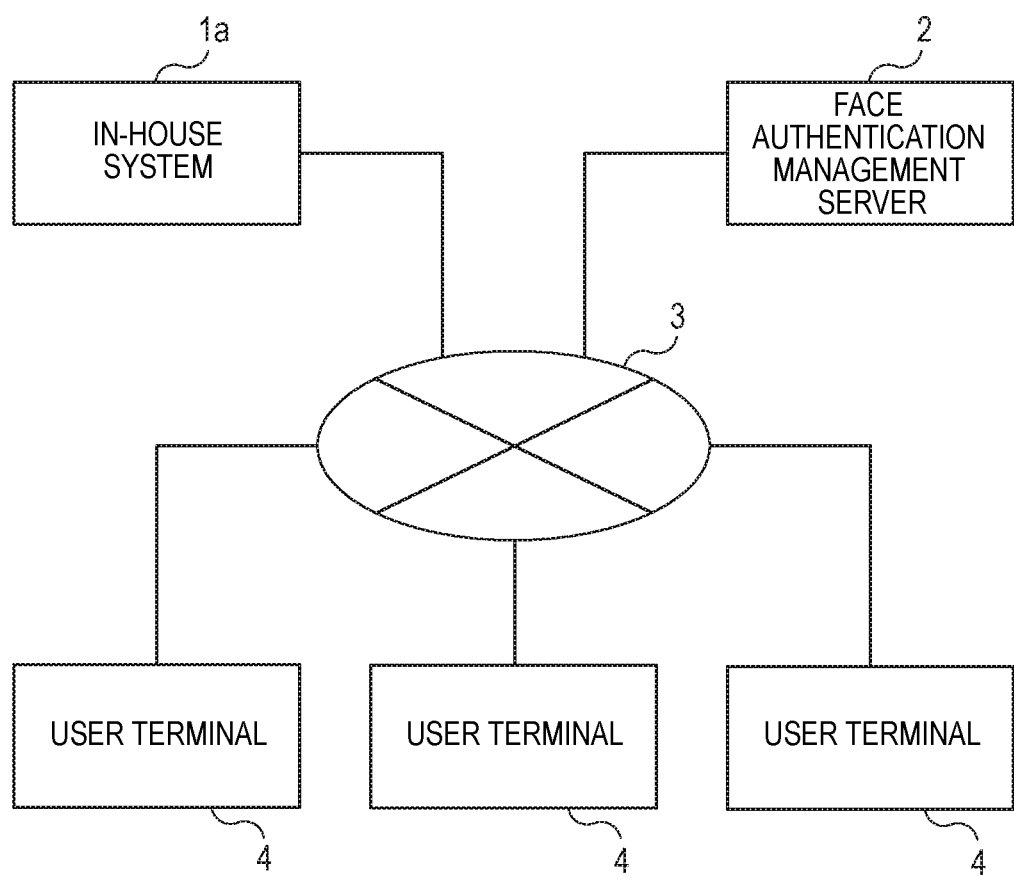
FIG. 11 is a schematic diagram illustrating a general configuration according to a sixth example embodiment.

While a remote teaching system including the learning management system 1, the face authentication management server 2, and the user terminal 4 is illustrated as examples in the example embodiment described above, the present invention is also applicable to a system that requires face authentication other than the remote teaching system. For example, the present invention is also applicable to a telework system that provides an environment of telework for stay-home work, freelance, or the like. FIG. 11 is a schematic diagram illustrating a general configuration of a telework system according to a sixth example embodiment. The telework system includes an in-house system 1a, the face authentication management server 2, and the user terminal 4. A difference from FIG. 1 is that, while the accessed target of the user terminal 4 is the learning management system 1 in FIG. 1, the accessed target of the user terminal 4 is the in-house system 1a in FIG. 11. That is, the accessed target system of the present example embodiment is the in-house system 1a.

The in-house system 1a is a connecting system to which the user of the user terminal 4 is connected to transmit or receive data and work by telework. The in-house system 1a may include a data server or the like, for example. At login for the connection from the user terminal 4 to the in-house system 1a, identity verification using face authentication is performed to ensure security such as to maintain a trade secret. Further, face authentication is performed for monitoring an operation status in a logged-in state. As discussed above, since the telework system of the present example embodiment also requires face authentication similar to that in the example embodiments described above, it is possible to apply the present invention to the telework system and obtain the same advantages by replacing the configuration of the example embodiments described above with the telework system as appropriate.

In the telework system of the present example embodiment, a specific example of a state in which face authentication is performed with the threshold S1 that is higher than the threshold S2 of the similarity degree used as a criterion of face authentication as a normal operation may relate to a status where information of a high degree of secrecy is handled other than at the time of login. An example of a status where information of a high degree of secrecy is handled may relate to a case of opening a file including human resource information such as attendance management, human resource management, or the like, a case of opening a file which may include other company's confidentially, such as a file sent from others or other companies, a case of opening a file which may cause much influence. When leaked, such as customer information, personal information, or the like.

Seventh Example Embodiment

Figure 12:
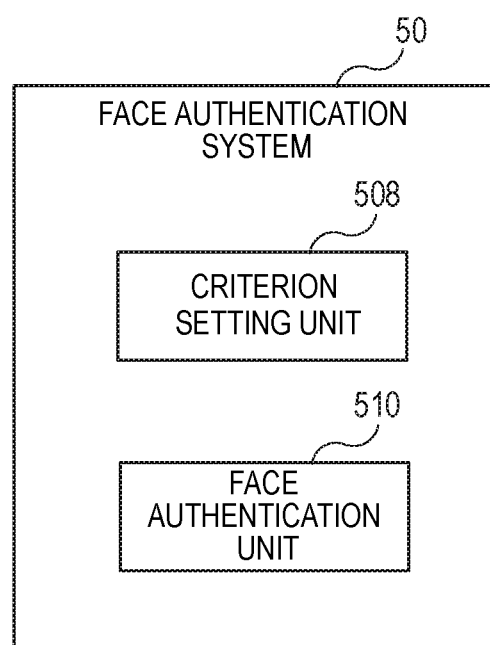
FIG. 12 is a function block diagram of a face authentication system according to a seventh example embodiment.

A device as described in the above example embodiments can also be configured as below. FIG. 12 is a functional block diagram of the face authentication system 50 according to a seventh example embodiment. The face authentication system 50 has a criterion setting unit 508 that sets a criterion of face authentication performed on a user so as to be different in accordance with a state of an access target system accessed by the user. Furthermore, the face authentication system 50 has the face authentication unit 510 that performs face authentication of the user based on the criterion.

According to the present example embodiment, a face authentication system that can set a criterion of face authentication in a more suitable manner can be provided.

Modified Example Embodiments

The present invention is not limited to the example embodiment described above but can be changed as appropriate within a range not departing from the spirit of the present invention.

While the example of face authentication has been illustrated as a scheme of authentication in each of the above example embodiments, other authentication schemes may be added in addition to face authentication. Specifically, by estimating a line of sight of the user based on an image of the user, it is possible to authenticate whether or not the user is properly looking at the content. Further, impersonation using a photograph, a static image, or the like can be prevented by capturing a moving image of the user by the camera 43 and performing motion authentication for blinking, movement of the mouth, instructed movement of the face, or the like.

While face authentication is performed based on the relationship between a similarity degree and a threshold of a face image of the user and a comparison target image in each of the above example embodiments, a temporal change of the similarity degree between a face image of the user and a comparison target image may also be a criterion of authentication. For example, when a temporal change amount of the similarity degree between a face image of the user and a comparison target image is smaller than a predetermined threshold, authentication to determine impersonation using a photograph, a static image, or the like may be performed. Typically, since there is no state where the user does not move at all, the similarity degree between a face image of the user and a comparison target image varies in accordance with time. In the case of impersonation using a photograph, a static image, or the like, however, the face image of the user is in a state of not moving at al, and thus the similarity degree between the face image of the user and the comparison target image is a constant value. Therefore, impersonation using a photograph, a static image, or the like can be prevented by performing authentication with the criterion described above.

While the face authentication system using face authentication as an example of biometrics authentication has been Illustrated as an example in each of the above example embodiments, the same scheme can be applied to a system using another biometrics authentication. In biometrics authentication, there are biometrics authentication with a relatively high authentication accuracy, such as fingerprint authentication, vein authentication, iris authentication, or the like and biometrics authentication with a relatively low authentication accuracy, such as face authentication, a voice authentication, or the like. In the example embodiments described above, examples in which the threshold of a similarity degree used as a criterion of a face authentication at login, in a test period, at logoff, or at the start of a content is set higher than that in other periods has been illustrated. By replacing the level of the thresholds of the similarity degree in these example embodiments with the level of the authentication accuracy of biometrics authentication, the example embodiments described above can be extended to general biometrics authentication.

A specific example of such a biometrics authentication system will be described. The biometrics authentication system in this example has a first biometrics authentication scheme with a relatively high authentication accuracy, such as fingerprint authentication, vein authentication, iris authentication, or the like and a second biometrics authentication scheme with a relatively low authentication accuracy, such as face authentication, voice authentication, or the like and may perform at least two types of biometrics authentication. Biometrics authentication is performed by using the first biometrics authentication scheme with a relatively high authentication accuracy, such as fingerprint authentication, vein authentication, iris authentication, or the like at login, in a test period, at logoff, or at the start of a content (that is, a period in which the threshold S1 is set in the example embodiments described above). Biometrics authentication is performed by using the second biometrics authentication scheme with a relatively low authentication accuracy, such as face authentication, voice authentication, or the like in a period other than at login, in a test period, at logoff, or at the start of a content (that is, a period in which the threshold S2, is set in the example embodiments described above).

With the biometrics authentication system being configured in such a way, the accuracy of biometrics authentication can be differentiated in accordance with a state of an accessed target system accessed by the user, and a biometrics authentication system in which the accuracy of biometrics authentication can be set in a more suitable manner can be provided.

As described above, there is an advantage of a relatively high authentication accuracy in fingerprint authentication, vein authentication, iris authentication, or the like. To acquire a fingerprint image, however, a scanner used for reading a fingerprint is necessary. Further, to acquire a vein image, a scanner capable of reading a vein is necessary. These scanners may not be provided to a general computer, and additional cost may occur. Further, since an iris image is generally acquired by capturing a narrow region of an iris by using an infrared ray, a camera which is more expensive than a camera provided to a general computer may be necessary.

The authentication accuracy of face authentication or voice authentication is relatively low. However, a camera or a microphone generally provided to a computer can be used to acquire a face image or acquire voice data of a voice. Information processing for performing face authentication or voice authentication can be implemented by introducing software. Implementation of face authentication or voice authentication does not require addition of hardware to the computer as discussed above, and the cost is relatively low.

An authentication scheme used in the biometrics authentication system is selected taking accuracy, cost, or the like into consideration as described above. Since the cost of hardware required for biometrics authentication is relatively low, it is more desirable that the first biometrics authentication scheme with a relatively high authentication accuracy be fingerprint authentication and the second biometrics authentication scheme with a relatively low authentication accuracy be face authentication.

Further, while the example of performing two types of biometrics authentication has been described above, a single type of biometrics authentication may be employed when the authentication accuracy can be changed by a setting change or the like in the same type of biometrics authentication.

Figure 13:
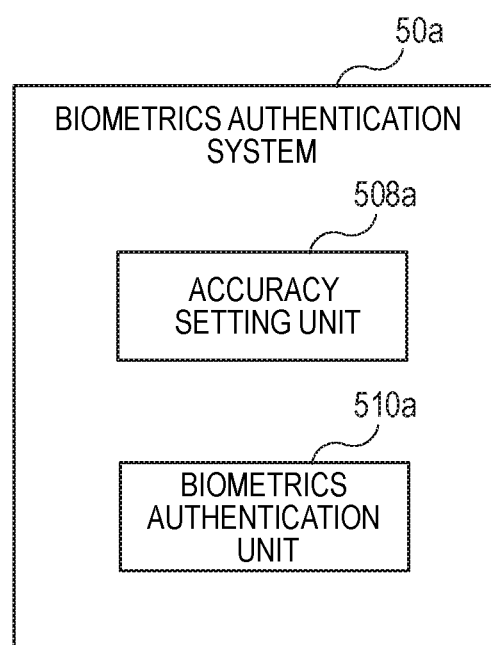
FIG. 13 a function block diagram of a biometrics authentication system according to a modified example embodiment.

The biometrics authentication system described above can also be configured as below. FIG. 13 is a function block diagram of the biometrics authentication system 50a according to the modified example embodiment. The biometrics authentication system 50a has an accuracy setting unit 508a that sets a criterion of biometrics authentication performed on the user so as to be different in accordance with the state of an access target system accessed by the user. Furthermore, the biometrics authentication system 50a has the biometrics authentication unit 510a that performs biometrics authentication of the user based on the accuracy.

According to the present example embodiment, a biometrics authentication system that can set the accuracy of biometrics authentication in a more suitable manner can be provided.

The scope of each example embodiment also includes a processing method of storing, in a storage medium, a program that causes the configuration of the example embodiment to operate to implement the function of the example embodiment described above, reading out as a code she program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, a floppy (registered trademark) disk, a hard disk, an optical disk, a magneto-optical disk, a Compact Disk (CD)-ROM, a magnetic tape, a non-volatile memory card, or a ROM, for example, may be used. The scope of each example embodiment includes not only those executing a process with a program itself stored in the storage medium but also those operating on an operating system (OS) in cooperation with the function of another software or an extension board to execute the process.

Services realized by the function of each example embodiment described above can be provided to the user in a form of Software as a Service (SaaS).

Note that all the example embodiments described above are mere examples of embodiment in implementing the present invention, and the technical scope of the present invention should not be limited to these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary note 1)
A face authentication system comprising:
a criterion setting unit that sets a criterion of face authentication performed on a user so as to be different in accordance with a state of an access target system accessed by the user; and
a face authentication unit that performs face authentication of the user based on the criterion.

(Supplementary note 2)
The face authentication system according to supplementary note 1,
wherein the access target system is operable in at least a first state of accepting a face authentication result used for determining login permission of the user to the access target system and a second state of accepting a face authentication result of the user who has logged in the access target system, and
wherein the criterion setting unit sets criteria that are different between when the access target system is in the first state and when the access target system is in the second state.

(Supplementary note 3)
The face authentication system according to supplementary note 2,
wherein face authentication of the user is performed based on a similarity degree between a face image of the user and a comparison target image, and
wherein a similarity degree used as a criterion of face authentication in the first state is higher than similarity degree used as a criterion of face authentication in the second state.

(Supplementary note 4)
The face authentication system according to supplementary note 2 or 3,
wherein the access target system is further operable in a third state of accepting a face authentication result at logoff from the access target system of the user, and
wherein the criterion setting unit sets criteria that are different between when the access target system is in the second state and when the access target system is in the third state.

(Supplementary note 5)
The face authentication system according to supplementary note 4,
wherein face authentication of the user performed based on a similarity degree between a face image of the user and a comparison target image, and
wherein a similarity degree used as a criterion of face authentication in the third state is higher than a similarity degree used as a criterion of face authentication in the second state.

(Supplementary note 6)
The face authentication system according to any one of supplementary notes 1 to 5,
wherein the access target system is a learning management system that is operable in at least a fourth state of causing the user to take a test and a fifth state of causing the user to perform learning, and
wherein the criterion setting unit sets criteria that are different between when the access target system is in the fourth state and when the access target system is in the fifth state.

(Supplementary note 7)

The face authentication system according to supplementary note 6, wherein face authentication of the user performed based on a similarity degree between a face image of the user and a comparison target image, and wherein a similarity degree used as a criterion of face authentication in the fourth state is higher than a similarity degree used as a criterion or face authentication in the fifth state.

(Supplementary note 8)

The face authentication system according to any one of supplementary notes 1 to 7 further comprising a notification unit that notifies the user of a result of face authentication of the user.

(Supplementary note 9)

The face authentication system according to supplementary note 8, wherein, in accordance with a result of face authentication, the notification unit is able to perform any of a first notification indicating that recognition of a face image is successful and face authentication is allowed, a second notification indicating that recognition of a face image is successful and face authentication is not allowed, and a third notification indicating that recognition of a face image failed.

(Supplementary note 10)

The face authentication system according to any one of supplementary notes 1 to 9 further comprising an output unit that externally outputs a face image of the user when a predetermined condition regarding a result of face authentication is satisfied.

(Supplementary note 11)

The face authentication system according to supplementary note 10, wherein the predetermined condition is that face authentication has not been allowed continuously for predetermined times, (Supplementary note 12)

The face authentication system according to supplementary note 10, wherein the predetermined condition is that face authentication has not been allowed for predetermined times within a predetermined period.

(Supplementary note 13)

The face authentication system according to any one of supplementary notes 1 to 12, wherein the face authentication unit uses a face image acquired when the user logs in the access target system for the first time as a comparison target in face authentication at second and subsequent login.

(Supplementary note 14)

The face authentication system according to any one of supplementary notes 1 to 13, wherein the criterion is further determined based on at least one of position information on a terminal on which the user operates, network connection related information, and a start time interval of a content received from the access target system.

(Supplementary note 15)

The face authentication system according to supplementary note 14, wherein face authentication of the user performed based on a similarity degree between a face image of the user and a comparison target image, and wherein, based on at least one of position information of a terminal on which the user operates, network connection related information, and a start time interval of a content received from the access target system, a similarity degree used as a criterion of face authentication when it is determined that a playback environment of the content has changed is higher than a similarity degree used as a criterion of face authentication when it is determined that a playback environment of the content has not changed.

(Supplementary note 16)

A face authentication method comprising:

setting a criterion of face authentication performed on a user so as to be different in accordance with a state of an access target system accessed by the user; and performing face authentication of the user based on the criterion.

(Supplementary note 17)

A storage medium in which a program is stored, the program causing a computer to execute:

setting a criterion of face authentication performed on a user so as to be different in accordance with a state of an access target system accessed by the user; and performing face authentication of the user based on the criterion.

(Supplementary note 18)

A biometrics authentication system comprising:

an accuracy setting unit that sets an accuracy of biometrics authentication performed on a user so as to be different in accordance with a state of an access target system accessed by the user; and a biometrics authentication unit that performs biometrics authentication of the user based on the accuracy.

(Supplementary note 19)

A biometrics authentication method comprising:

setting an accuracy of biometrics authentication performed on a user so as to be different in accordance with a state of an access target system accessed by the user; and performing biometrics authentication of the user based on the accuracy.

(Supplementary note 20)

A storage medium in which a program is stored, the program causing a computer to execute:

setting an accuracy of biometrics authentication performed on a user so as to be different in accordance with a state of an access target system accessed by the user; and performing biometrics authentication of the user based on the accuracy.

REFERENCE SIGNS LIST 1 learning management system
1a in-house system
2 face authentication management server
3 network
4 user terminal
41 input device
42 display
43 camera
401 CPU
402 RAM
403 ROM
404 HDD
405 communication I/F
406 input device I/F
407 display I/F
408 peripheral device I/F
409 bus
50 face authentication system
50a biometrics authentication system
501 face image storage unit
502 feature amount calculation unit
503 feature amount storage unit 504 face image input/output unit
505 comparison target amount storage unit
506 authentication condition acquisition unit
507 state acquisition unit
508 criterion setting unit
508a accuracy setting unit
509 authentication result output unit
510 face authentication unit
510a biometrics authentication unit

The invention claimed is:

1. A biometrics authentication system comprising:
at least one memory storing a computer program; and
at least one processor configured to execute the computer program to:
set a frequency of performing biometrics authentication performed on a user so as to be different between when the system is in a first operation state and when the system is in a second operation state, the system being accessed by the user; and
perform biometrics authentication on the user at the set frequency based on the system being in the first operation state or in the second operation state;
wherein the first operation state is a state of accepting a biometrics authentication result used for determining login permission of the user to the system, and the second operation state is a state of accepting a biometrics authentication result used for determining whether the user is present while the user is logged in to the system; and
wherein the frequency in the first operation state is higher than the frequency in the second operation state and the required accuracy of the biometrics authentication in the first operation state is higher than the required accuracy of the biometrics authentication in the second operation state.

2. The biometrics authentication system according to claim 1, wherein the at least one processor is configured to execute the computer program to: present predetermined information to the user according to a result of the biometrics authentication.

3. The biometrics authentication system according to claim 2, wherein the at least one processor is configured to execute the computer program to: present the predetermined information by displaying characters in a display window.

4. The biometrics authentication system according to claim 2, wherein the at least one processor is configured to execute the computer program to: present the predetermined information by changing a color of a display window.

5. The biometrics authentication system according to claim 2, wherein the at least one processor is configured to execute the computer program to: present the predetermined information by a voice.

6. The biometrics authentication system according to claim 2, wherein the at least one processor is configured to execute the computer program to: present the predetermined information which urge the user into an action so as to succeed to recognize biometrics information of the user when recognition of the biometrics information fails in the biometrics authentication.

7. The biometrics authentication system according to claim 6, wherein the at least one processor is configured to execute the computer program to: present the predetermined information which urge the user to turn the user's face to a camera which acquires the biometrics information of the user.

8. A biometrics authentication method comprising:
setting a frequency of performing biometrics authentication performed on a user so as to be different between when the system is in a first operation state and when the system is in a second operation state, the system being accessed by the user; and
performing biometrics authentication on the user at the set frequency based on the system being in the first operation state or in the second operation state;
wherein the first operation state is a state of accepting a biometrics authentication result used for determining login permission of the user to the system, and the second operation state is a state of accepting a biometrics authentication result used for determining whether the user is present while the user is logged in to the system; and
wherein the frequency in the first operation state is higher than the frequency in the second operation state and the required accuracy of the biometrics authentication in the first operation state is higher than the required accuracy of the biometrics authentication in the second operation state.

9. The biometrics authentication method according to claim 8, wherein the method presents predetermined information to the user according to a result of the biometrics authentication.

10. The biometrics authentication method according to claim 9, wherein the method further presents the predetermined information by displaying characters in a display window.

11. The biometrics authentication method according to claim 9, wherein the method further presents the predetermined information by changing a color of a display window.

12. The biometrics authentication method according to claim 9, wherein the method further presents the predetermined information by a voice.

13. A non-transitory computer-readable storage medium in which a program is stored, the program causing a computer to execute:
setting a frequency of performing biometrics authentication performed on a user so as to be different between when the system is in a first operation state and when the system is in a second operation state, the system being accessed by the user; and
performing biometrics authentication on the user at the set frequency based on the system being in the first operation state or in the second operation state;
wherein the first operation state is a state of accepting a biometrics authentication result used for determining login permission of the user to the system, and the second operation state is a state of accepting a biometrics authentication result used for determining whether the user is present while the user is logged in to the system; and
wherein the frequency in the first operation state is set higher than the frequency in the second operation state and the required accuracy of the biometrics authentication in the first operation state is higher than the required accuracy of the biometrics authentication in the second operation state.

14. The non-transitory computer-readable storage medium according to claim 13, wherein the program causes the computer to execute presenting predetermined information to the user according to a result of the biometrics authentication.

15. The non-transitory computer-readable storage medium according to claim 14, wherein the program causes the computer to execute presenting the predetermined information by displaying characters in a display window.

16. The non-transitory computer-readable storage medium according to claim 14, wherein the program causes the computer to execute presenting the predetermined information by changing a color of a display window.

17. The non-transitory computer-readable storage medium according to claim 14, wherein the program causes the computer to execute presenting the predetermined information by a voice.

* * * * *